United States Patent [19]

Skinner et al.

[11] Patent Number: 4,636,334
[45] Date of Patent: Jan. 13, 1987

[54] PRODUCTION OF AMMONIA SYNTHESIS GAS

[75] Inventors: Geoffrey F. Skinner, Kimblewick; Wieslaw M. Kowal, Sunnyview; Stephen D. Linton, Pangbourne, all of England

[73] Assignee: Foster Wheeler USA Corporation, Livingston, N.J.

[21] Appl. No.: 764,194

[22] Filed: Aug. 9, 1985

[30] Foreign Application Priority Data

Aug. 14, 1984 [GB] United Kingdom ................. 8420644

[51] Int. Cl.$^4$ .......................... C01B 3/02; C01B 3/50; C01B 3/52
[52] U.S. Cl. ....................................... 252/377; 62/17; 62/20
[58] Field of Search ......................................... 252/377

[56] References Cited

U.S. PATENT DOCUMENTS

| | | | |
|---|---|---|---|
| 3,192,729 | 7/1965 | Becker | 62/13 |
| 3,251,189 | 5/1966 | Jakob | 62/13 |
| 3,312,075 | 4/1967 | Becker | 62/20 |
| 3,327,487 | 6/1967 | Karwat | 62/13 |
| 3,498,067 | 3/1970 | Ranke | 62/17 |
| 3,743,699 | 3/1973 | Bogart | 423/359 |
| 4,409,196 | 10/1983 | Skinner et al. | 423/359 |

*Primary Examiner*—Howard T. Mars
*Attorney, Agent, or Firm*—Marvin A. Naigur; John E. Wilson; Robert D. Bajefsky

[57] ABSTRACT

A process for removal of excess nitrogen and carbon oxides from a raw synthesis gas used to make ammonia. The raw synthesis gas is divided into two portions. The first portion is methanated to remove carbon oxides and then cooled to condense part of its nitrogen content. The condensed nitrogen is fed to the top of a nitrogen wash column. The second portion of the raw synthesis gas is passed over an absorbent which removes carbon dioxide and water vapor. It is then cooled to condense excess nitrogen. The remaining gas is fed to the bottom of a nitrogen wash column where it is washed free of carbon monoxide by the nitrogen condensed from the methanated gas stream.

16 Claims, 3 Drawing Figures

PRODUCTION OF AMMONIA SYNTHESIS GAS

This invention relates to the production of ammonia synthesis gas from gas mixtures containing more than the stoichiometric amount of nitrogen needed for the synthesis of ammonia.

The synthesis of ammonia by the reaction $$3H_2 + N_2 \rightarrow 2NH_3$$

requires a feed gas stream (known as "ammonia synthesis gas") consisting of hydrogen and nitrogen in a molar ratio of 3:1 or close thereto.

Manufacture of ammonia from fossil fuels generally involves the following main steps:

(1) generation of a raw synthesis gas containing hydrogen and carbon monoxide from the fossil fuel by reaction with steam, air and/or oxygen;

(2) further reaction of this gas with steam in carbon monoxide shift convertors, wherein the carbon monoxide is oxidized to carbon dioxide, with evolution of an equal volume of hydrogen; and (3) removal of carbon dioxide from the shifted gas with a suitable solvent.

The resulting synthesis gas contains small amounts of oxygen-containing compounds—carbon oxides and water vapor—that are deleterious to the operation of ammonia synthesis catalysts. These must be removed before the synthesis gas reaches the ammonia synthesis convertor.

There are in the main two alternative processing arrangements for removal of the residual content of carbon oxides, i.e.

(1) methanation over a suitable catalyst, (2) adsorption of the carbon dioxide onto a suitable solid such as molecular sieve, followed by removal of the carbon monoxide by washing with liquid nitrogen.

The methanation process involves an undesirable loss of hydrogen. The adsorption/nitrogen wash process requires an air separation plant to be installed as the source of oxygen-free nitrogen.

Ammonia synthesis gas processes have recently been disclosed, e.g. in U.S. Pat. No. 4,409,196, in which the raw synthesis gas is produced by partial oxidation with air and contains more nitrogen than that required for the ammonia synthesis reaction. The excess nitrogen must be removed before the synthesis gas enters the ammonia convertor. This is usually to be achieved by cryogenic condensation of the excess nitrogen.

We have now unexpectedly found that the removal of the residual carbon oxides and excess nitrogen in the process scheme described in U.S. Pat. No. 4,409,196 may be achieved by a novel combination of the methanation and adsorption/nitrogen wash systems described above, such that hydrogen loss through methanation is minimized and no separate nitrogen generator is required.

According to this novel scheme, liquid nitrogen of the purity required for the wash column can be provided by passing only part of the raw synthesis gas through a methanator, cooling and partially condensing the methanated stream and employing the resulting condensate as a scrubbing liquid in the wash column. In this way the loss of hydrogen in the methanation step can be greatly reduced, while the cryogenic unit, which is needed in any event for removal of the excess nitrogen, merely requires the addition of a wash column.

Thus, according to the present invention, there is provided a process for the production of gaseous feed for the production of ammonia from a raw synthesis gas stream comprising hydrogen, nitrogen and carbon monoxide having a molar ratio of hydrogen:nitrogen of less than 3:1, said process comprising:

(a) subjecting a first portion of said raw synthesis gas stream to methanation to convert carbon monoxide contained therein to methane, (b) cooling and partially condensing the product of step (a), (c) cooling and partially condensing a second portion of said raw synthesis gas stream, (d) washing uncondensed produce from step (c) with condensate from step (b), and (e) recovering washed gas from step (d) and uncondensed gas from step (b) for use as the gaseous feed for ammonia synthesis.

Where the raw synthesis gas stream contains carbon dioxide, carbon dioxide contained in the first portion thereof may be converted to methane during step (a).

Preferably, the condensate from step (b), after having been used in step (d) to wash the vapor portion resulting from step (c), is mixed with the liquid portion of step (c), expanded to an intermediate pressure and used to cool and partially condense the first portion of said raw synthesis gas in step (b) and the second portion in step (c).

In a preferred method of operation, the expanded condensate may be separated into gaseous and liquid components and at least a part of the gaseous component is recycled, combined with the first portion of said raw synthesis gas stream and subjected to methanation in step (a).

Generally the first portion of the raw synthesis gas stream which is subjected to methanation in step (a) is a minor portion, e.g. less than 50% of the raw synthesis gas stream, and preferably comprises from 20 to 40% of the raw stream. The second portion fed to step (c) would thus comprise a major portion of the raw stream.

In carrying out the process of the invention one or both of (1) the uncondensed gas streams from step (b) and (2) the washed gas from step (d) may be used to cool and partially condense the product of step (a) and/or the second portion of the raw sythesis gas stream in step (c).

In a preferred embodiment of the invention, the vapor resulting from the expansion to an intermediate pressure of the liquid resulting from mixing the condensate which has served as washing liquid and the liquid portion of step (c) may be further expanded to a lower pressure in an expander to produce refrigeration for the process.

Prior to being cooled, the product of step (a) and the second portion of raw synthesis gas may be treated to remove any water or carbon dioxide values which might otherwise condense or freeze in subsequent low temperature stages.

Thus in more detail, the process of the invention, in its preferred aspects, involves separating raw synthesis gas, as it leaves the carbon dioxide removal process, into two streams, one of which, after drying and removal of residual traces of $CO_2$, for example by adsorption on molecular sieves or other suitable adsorbents, is cooled and partially condensed in heat exchange with returning streams in a cryogenic unit and the vapor fed to the base of a wash column, while the other portion, possibly after being joined by a recycle stream, is methanated, dried and cooled and partially condensed, the resulting condensate being fed as scrubbing liquid to the top of the wash column. Purified synthesis gas of predetermined, e.g. stoichiometric, composition leaves the top of the column and may be warmed to ambient temperature in heat exchange with incoming streams. The liquid bottoms product of the wash column together with the liquid portion resulting from step (c) may then be flashed to a lower pressure, the remaining liquid being evaporated and warmed in the exchanger, while the resulting vapor is work-expanded to provide refrigeration, after which it is warmed, compressed and, if desired, recycled to the stream fed to the methanator.

By operating in accordance with the present invention the loss of hydrogen from the synthesis gas stream which occurs during methanation may be reduced without there being any need to provide a separate source of supply of liquid nitrogen to wash out carbon monoxide not converted to methane by methanation.

The process of the invention will now be described in more detail by way of example with particular reference to the accompanying drawings of which:

Figure 1:
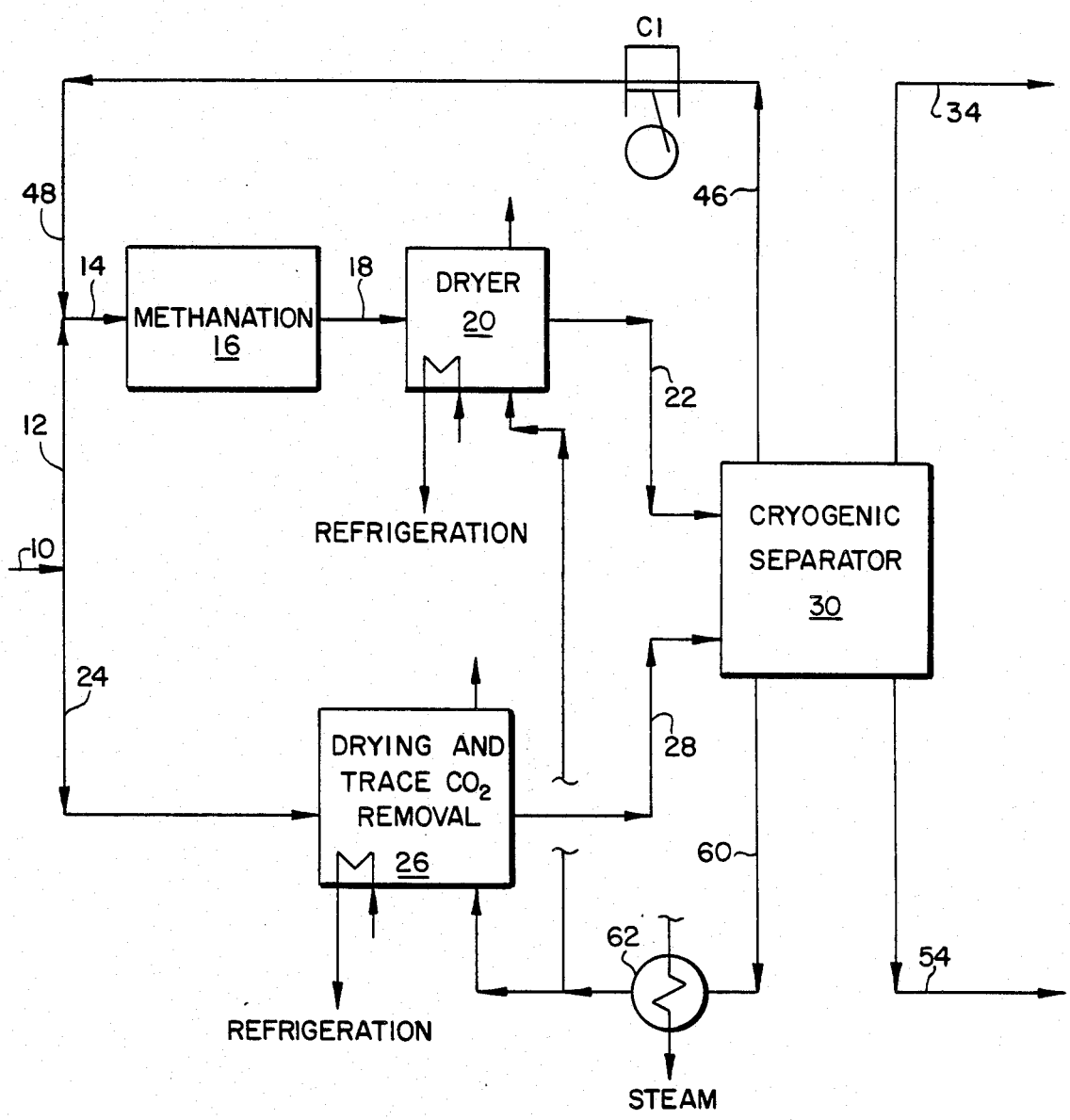
FIG. 1 is a block diagram of a plant suitable for carrying out the process of the invention.

With reference to FIG. 1, a raw ammonia synthesis gas feed stream at 27.5 bar abs. in line 10 comprising hydrogen and nitrogen in a mole ratio less than 3:1 and oxides of carbon is divided into a first portion stream in line 12 and a second portion stream in line 24 of which the stream in line 12, joined by a recycle stream in line 48 is passed through line 14 and methanated in methanator 16 and passed through line 18 to drier 20 and then via line 22 to cryogenic unit 30. Methanator 16 operates in a conventional manner to convert oxides of carbon to methane in accordance with the following equation:

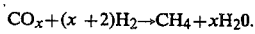

$$CO_x + (x+2)H_2 \rightarrow CH_4 + xH_2O.$$

Similarly drier 20 operates conventionally, i.e. it contains a typical molecular sieve drying medium and is cooled using an ammonia refrigeration system to remove bulk water prior to contacting the methanated stream with the drying medium during the drying cycle. Periodically the drier is regenerated using a gas stream, the source of which will be described below.

The stream in line 24 is fed to a drier 26 operated in a similar manner to drier 20 and then fed through line 28 to the cryogenic unit 30. Since the stream in line 24 has not been methanated, it will contain trace amounts of carbon dioxide, which are removed along with water in the drier 26, and carbon monoxide.

Figure 2:
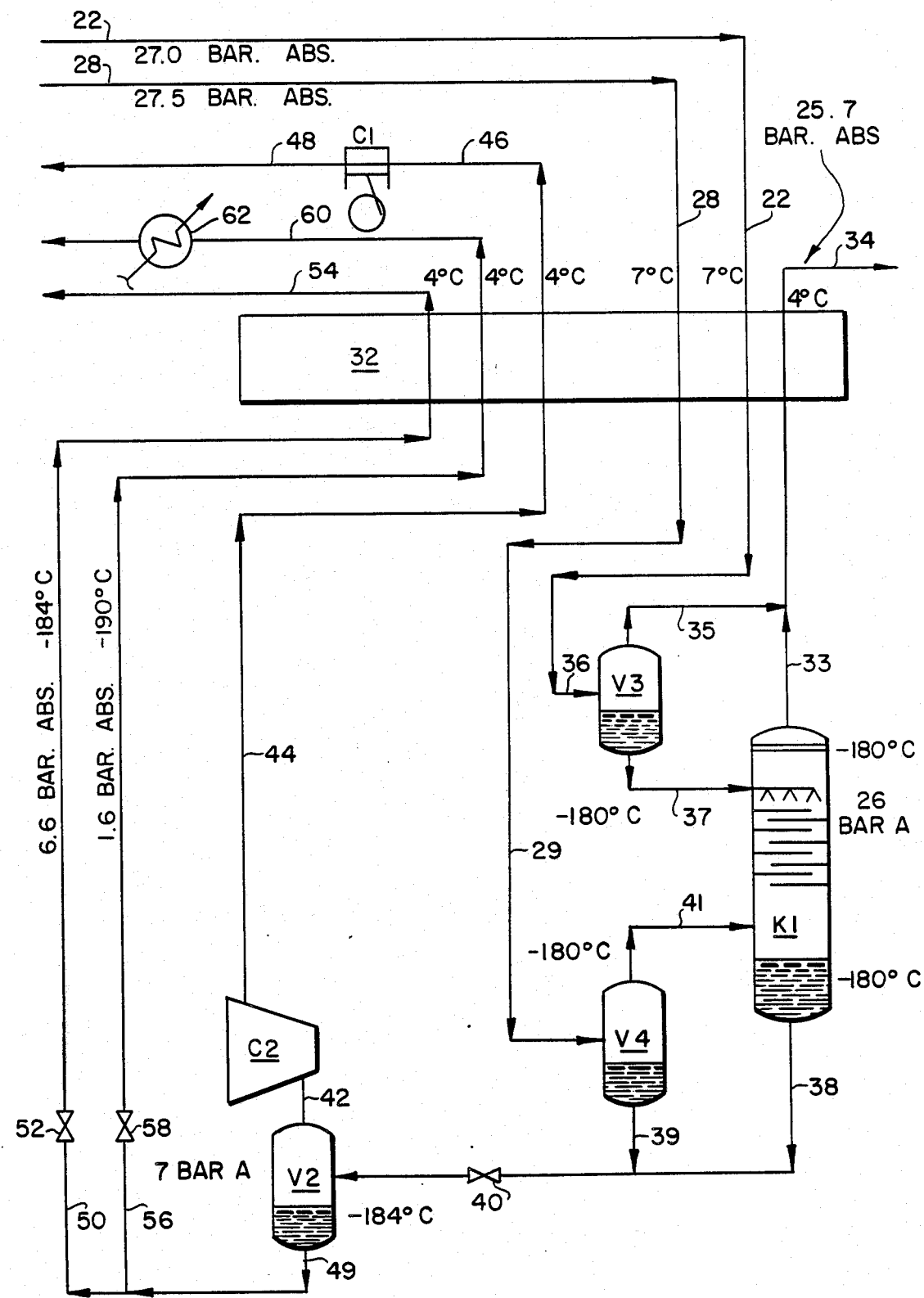
FIG. 2 shows the cryogenic unit of FIG. 1 in greater detail.

With reference to FIG. 2, the methanated and dried stream in line 22 is passed through heat exchanger 32, where it is cooled to about −180° C. and partially condensed by heat exchange with cold recycle effluent and product streams described below, and then through line 36 and separator V3 to the top of wash column K1 through line 37.

The dried stream from drier 26 in line 28 (i.e. the stream derived from the second portion of the impure synthesis gas which did not pass through methanator 16) is also cooled to about −180° C. in heat exchanger 32 and fed to separator V4 through line 29. The vapor portion from separator V4 is fed to the wash column K1 through line 41, the liquid portion in line 39 being mixed with the bottoms liquid leaving the column in line 38.

The liquid and gaseous components of the partially condensed stream in line 36 disengage in the separator V3 and the liquid component (comprising essentially pure liquid nitrogen) fed into wash column K1 through line 37 descends the column and washes the vapor fed to the column via lines 29 and 41. The gaseous component from separator V3 is passed through line 35 to join the gaseous produce leaving the top of wash column K1 through line 33 which is heated in heat exchanger 32 and passed on at 26.0 bar abs via line 34 and is compressed for use as feedstock for ammonia synthesis.

Liquid taken from the base of column K1 in line 38 together with liquid from separator V4 in line 39 is expanded through valve 40 into vessel V2 from which the vapor passes in line 42 to expander C2 (wherein the temperature of the vapor is reduced to provide an additional source of low temperature fluid to heat exchanger 32) and then via line 44 through exchanger 32 to emerge as a stream in line 46 for compression in compressor C1 and recycle via line 48 to join the first portion stream in line 12 which is fed via line 14 to the methanator.

The liquid component from vessel V2 in line 49 is divided into two streams in lines 50 and 56 which are flashed separately through valves 52 and 58, respectively. The stream in line 56 is flashed to a relatively low pressure (e.g. 1.6 bar), passed through heat exchanger 32 and then via line 60 to heater 62 where it is heated for use in the periodic regeneration of driers 20 and 26.

The stream in line 50 is expanded to a higher pressure (e.g. 6.6 bar) and after passing through heat exchanger 32 leaves in line 54. It is subsequently heated and expanded in a gas turbine to generate power.

Figure 3:
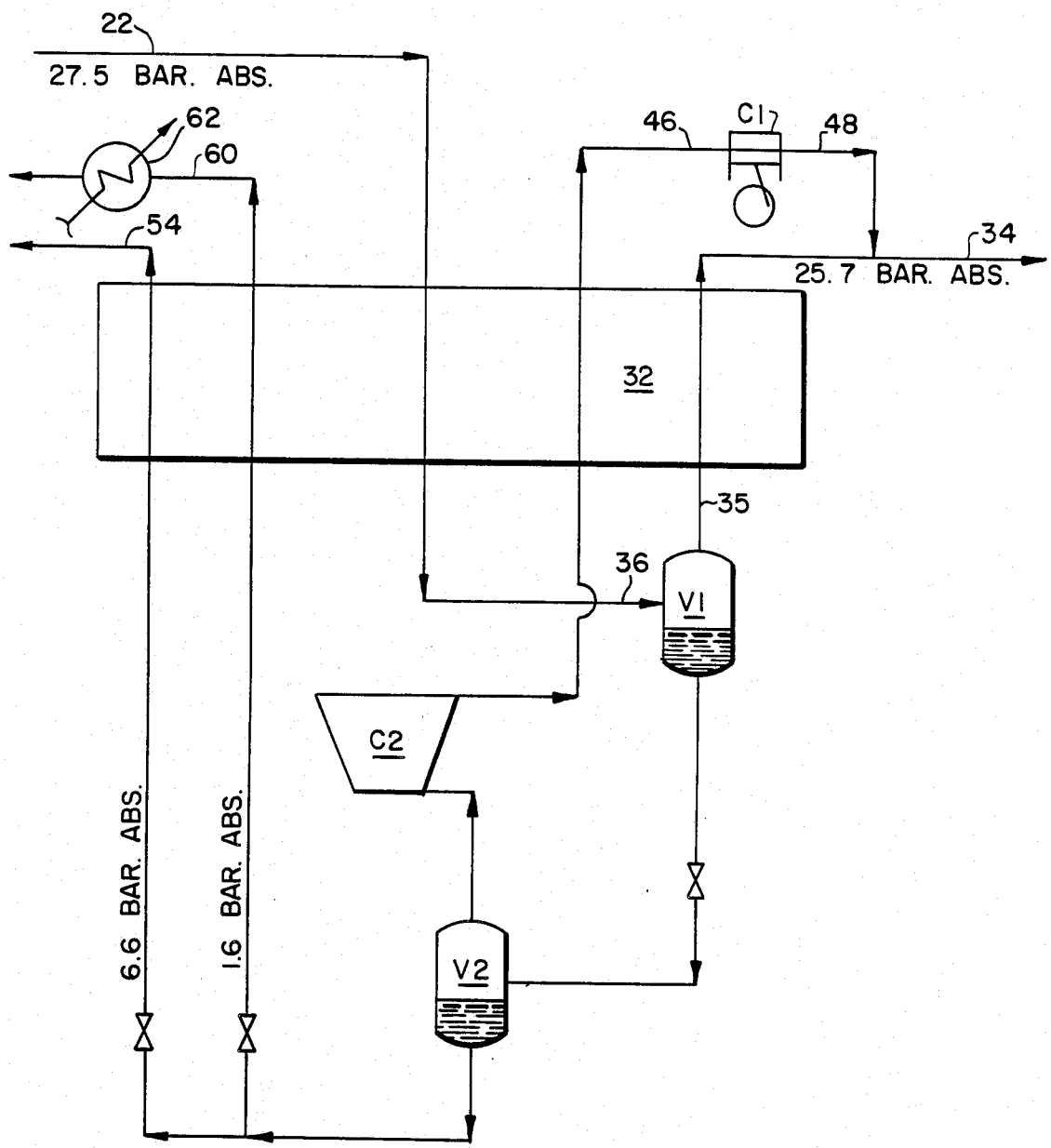
FIG. 3 illustrates a cryogenic unit of a synthesis gas purification plant operated in a manner which does not incorporate the procedure of the invention.

FIG. 3 illustrates a purification scheme not incorporating the improvement of the present invention. In this scheme (which in other respects operates in a manner similar to that shown in FIGS. 1 and 2) the entire input stream of impure synthesis gas in line 10 is methanated and dried prior to being cooled in heat exchanger 32, passed to vessel V1 through line 36 and partially condensed and separated in vessel V1 into liquid and vapor components. The vapor component is sent via line 34 for use as ammonia synthesis gas and the liquid component is treated as described above in connection with FIG. 2.

The process of the invention (as operated in accordance with the flow scheme of FIGS. 1 and 2) was compared with a process operated in accordance with the flow scheme of FIG. 3. The flow rate, pressure, temperature and composition of the crude synthesis gas stream used were the same in both cases and were as follows:

| | Mol % | |
|---|---|---|
| $H_2$ | 49.9 | Pressure 27.5 bar abs. |
| $N_2$ | 48.5 | Temperature 64° C. |
| CO | 0.9 | Flow rate 8504.8 kg mol/h |
| Ar | 0.5 | |
| $CH_4$ | 0.2 | |
| | 100.0 | |

The hydrogen flow corresponded in each case to an ammonia production of approximately 1000 tonnes/day.

In both cases the purified synthesis gas (the stream in line 34) was recovered at 26 bar. The flow of flash gas through the expander C2 was 305.7 kg mol/h in the scheme FIG. 2 and 303.9 kg mol/h in the scheme FIG. 3.

In both cases the waste nitrogen was withdrawn in two streams, in lines 54 and 60; the stream in line 54 being at 6.5 bar and the stream in line 60 at 1.5 bar. The stream in line 60 was used to regenerate the driers. The stream in line 54 was subsequently heated and expanded in a gas turbine to generate power.

From the mass balances given in Tables 1 and 2, the flow rate of hydrogen in the purified synthesis gas was 4130.7 kg mol/h in the flow scheme of FIGS. 1 and 2 (Table 1) compared with 3984.7 kg mol/h in the flow scheme of FIG. 3 (Table 2), leading approximately to an additional 36 tonnes/day of ammonia product.

(e) recovering washed gas from step (d) and uncondensed gas from step (b) for use as said gaseous feed for ammonia synthesis.

2. A process according to claim 1, wherein said raw synthesis gas stream contains carbon dioxide, and said carbon dioxide is removed from said second portion prior to cooling and partially condensing that portion in step (c).

3. A process according to claim 2 wherein carbon dioxide contained in said raw synthesis gas stream is converted to methane in step (a).

4. A process according to claim 1 wherein said first portion comprises less than 50% of said raw synthesis gas stream.

5. A process according to claim 4 wherein said first portion comprises 20 to 40% of said raw synthesis gas stream.

6. A process according to claim 1 wherein the product of step (a) is dried prior to being cooled in step (b).

7. A process according to claim 1 wherein said sec-

TABLE 1

| Line** | 12 Fresh Methanator Feed | 24 Methanator By-pass | 18 Methanator Product | 22 Dry Methanated Gas | 28 Dry Methanator By-Pass | 54 Medium Pressure Waste | 60 Low Pressure Waste | 46 Flash Gas | 34 Synthesis Gas |
|---|---|---|---|---|---|---|---|---|---|
| Hydrogen | 1273.4 | 2971.3 | 1343.5 | 1343.5 | 2971.3 | 28.6 | 9.6 | 145.9 | 4130.7 |
| Nitrogen | 1235.7 | 2883.2 | 1392.2 | 1392.2 | 2883.2 | 2056.5 | 685.5 | 156.5 | 1376.9 |
| Carbon Monoxide | 22.4 | 52.4 | — | — | 52.4 | 38.0 | 12.6 | 1.8 | — |
| Argon | 13.5 | 31.6 | 14.4 | 14.4 | 31.6 | 27.2 | 9.1 | 0.9 | 8.8 |
| Methane | 5.6 | 13.1 | 31.2 | 31.2 | 13.1 | 29.1 | 9.7 | 0.6 | 4.9 |
| Carbon Dioxide | 0.8 | 1.8 | — | — | — | — | — | — | — |
| Water Vapor | Sat. | Sat. | Sat. | — | — | — | — | — | — |
| Total (dry) | 2551.4 | 5953.4 | 2781.3 | 2781.3 | 5951.6 | 2179.4 | 726.5 | 305.7 | 5521.3 |
| Pressure (bar abs.) | 27.5 | 27.5 | 27.0 | 26.6 | 27.1 | 6.5 | 1.5* | 1.9 | 26.0 |
| Temperature (°C.) | 64 | 64 | 40 | 7 | 7 | 4 | 4 | 4 | 4 |

*used for regeneration of adsorbers
**all values are kg mol/h unless otherwise indicated.

TABLE 2

| Line** | 10 Fresh Methanator Feed | 18 Methanator Product | 22 Dry Methanated Gas | 54 Medium Pressure Waste | 60 Low Pressure Waste | 46 Flash Gas | 34 Synthesis Gas |
|---|---|---|---|---|---|---|---|
| Hydrogen | 4244.7 | 4009.9 | 4009.9 | 18.9 | 6.3 | 145.9 | 3984.7 |
| Nitrogen | 4118.9 | 4118.9 | 4118.9 | 2093.0 | 697.7 | 156.5 | 1328.2 |
| Carbon Monoxide | 74.8 | — | — | — | — | — | — |
| Argon | 45.1 | 45.1 | 45.1 | 27.0 | 9.0 | 0.9 | 9.1 |
| Methane | 18.7 | 96.1 | 96.1 | 68.2 | 22.7 | 0.6 | 5.2 |
| Carbon Dioxide | 2.6 | — | — | — | — | — | — |
| Water Vapor | Sat. | Sat. | — | — | — | — | — |
| Total (dry) | 8504.8 | 8270.0 | 8270.0 | 2207.1 | 735.7 | 303.9 | 5327.2 |
| Pressure (bar abs.) | 27.5 | 26.6 | 26.3 | 6.5 | 1.5* | 1.9 | 25.7 |
| Temperature (°C.) | 64 | 40 | 7 | 4 | 4 | 4 | 4 |

*used for regeneration of adsorbers
**all values are kg mol/h unless otherwise indicated.

We claim:

1. A process for the production of gaseous feed for the synthesis of ammonia from a raw synthesis gas stream comprising hydrogen, nitrogen and carbon monoxide having a molar ratio of hydrogen: nitrogen of less than 3:1, said process comprising:
   (a) subjecting a first portion of said raw synthesis gas stream to methanation to convert carbon monoxide contained therein to methane;
   (b) cooling and partially condensing the product of step (a);
   (c) cooling and partially condensing a second portion of said raw synthesis gas stream;
   (d) washing uncondensed product from step (c) with condensate from step (b); and ond portion of said raw synthesis gas stream is dried prior to being cooled in step (c).

8. A process according to claim 1 wherein the product of step (a) is cooled at least in part by heat exchange with uncondensed gas from step (b).

9. A process according to claim 1 wherein the product of step (a) is cooled at least in part by heat exchange with washed gas from step (d).

10. A process according to claim 1 wherein said second portion of said raw synthesis gas stream is cooled at least in part by heat exchange with uncondensed gas from step (b).

11. A process according to claim 1 wherein said second portion of said raw synthesis gas is cooled at least in part by heat exchange with washed gas from step (d).

12. A process according to claim 1 wherein the condensate from step (b), after having been used to wash cooled raw synthesis gas in step (d), is expanded to form a cold gaseous stream which is then used to cool at least one of the partially condensed product of step (a) and the second portion of said raw synthesis gas stream.

13. A process according to claim 12 wherein the expanded condensate is separated into gaseous and liquid components and at least a part of the gaseous component is recycled, combined with the first portion of said raw synthesis gas stream, and subjected to methanation in step (a).

14. A process according to claim 12, wherein the liquid component of the expanded condensate is expanded and used to cool at least one of the partially condensed product of step (a) and the second portion of said raw synthesis gas stream.

15. A process according to claim 12 in which a major part of the liquid component is expanded, used to cool at least one of the partially condensed product of step (a) and the second portion of said raw synthesis gas stream and subsequently workexpanded to supply mechanical power.

16. A process according to claim 12 wherein a minor part of the liquid component is expanded, used to cool at least one of the partially condensed product of step (a) and the second portion of said raw synthesis gas stream, heated further and used to regenerate the drying means used to dry the product of step (a) prior to washing in step (b) and to regenerate the drying means used to dry the second portion of said raw synthesis gas prior to its being cooled in step (c).

* * * * *